J. H. HIMES.
VALVE.
APPLICATION FILED MAR. 15, 1915.
1,221,178.
Patented Apr. 3, 1917.
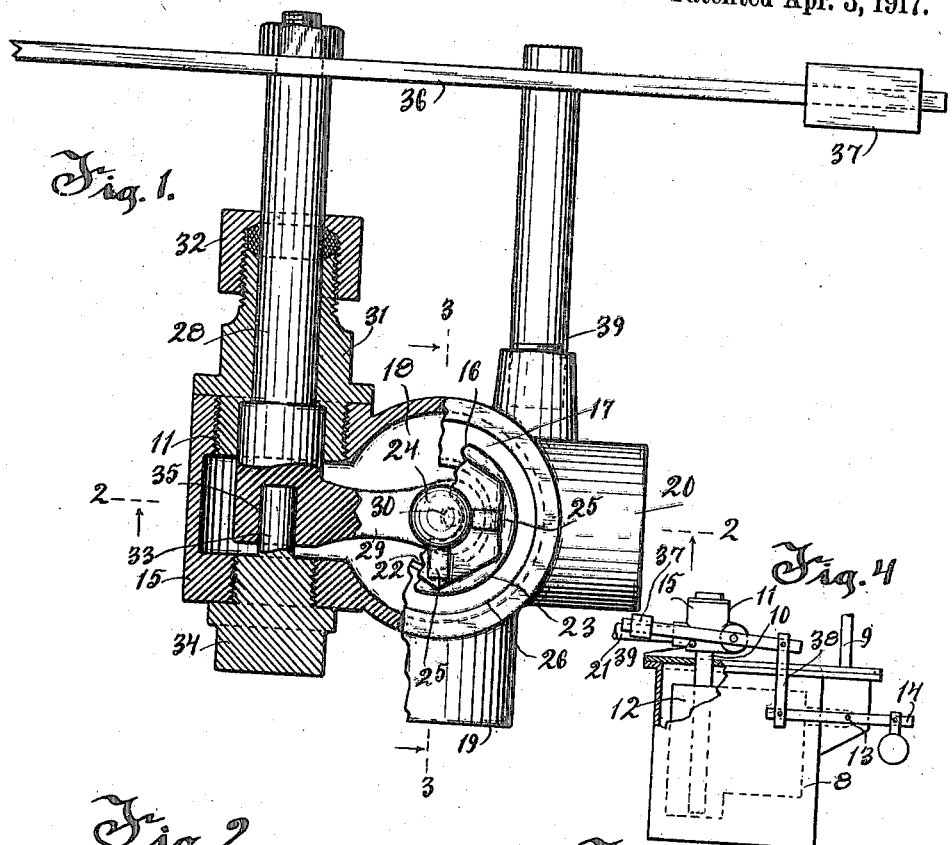
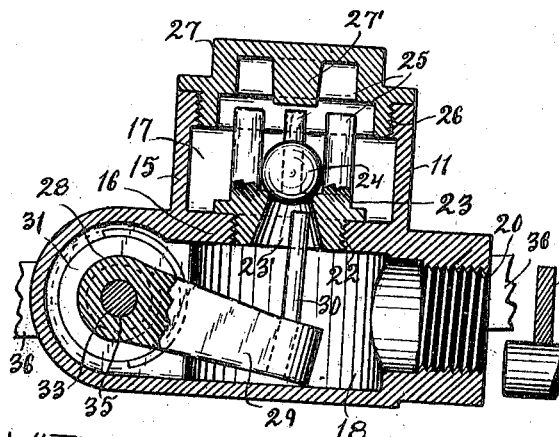
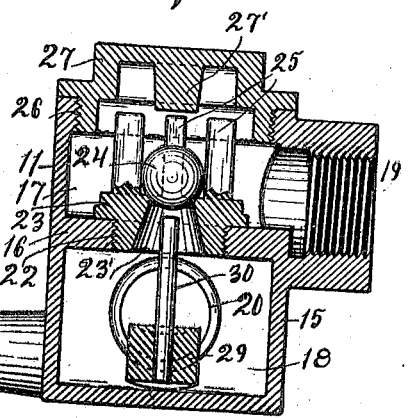
WITNESSES
G. F. Miller
E. Schowalter
INVENTOR
John H. Himes
By Morsell, Keeney & French,
ATTORNEYS

UNITED STATES PATENT OFFICE.

JOHN H. HIMES, OF MILWAUKEE, WISCONSIN.

VALVE.

1,221,178. Specification of Letters Patent. Patented Apr. 3, 1917.

Application filed March 15, 1915. Serial No. 14,540.

*To all whom it may concern:*

Be it known that I, JOHN H. HIMES, a citizen of the United States, and resident of Milwaukee, in the county of Milwaukee and State of Wisconsin, have invented new and useful Improvements in Valves, of which the following is a description, reference being had to the accompanying drawings, which are a part of this specification.

This invention relates to improvements in valves more particularly adapted for use in connection with steam traps for the discharge of water of condensation from steam pipes.

The modern steam trap of the better class usually comprises a casing provided with an open top float which controls the opening and closing of a valve for discharging the water of condensation flowing into the casing. In traps of this type the water within the casing holds the float in its upper position and the valve closed until the water overflows over the top of the float and fills the same. As soon as this occurs and the float loses its buoyancy it will swing downwardly and open the discharge valve. A discharge pipe extending into the float to a point adjacent its bottom will permit the pressure of the steam to force the water in the float through the pipe and the valve until the float is emptied and its buoyancy is reestablished and the float again swings upwardly and closes the valve to prevent the escape of live steam therethrough.

Heretofore ordinary plunger valves have been used in connection with traps of this type but they have not been found satisfactory in every respect.

It is one of the objects of the present invention to provide a valve which is particularly adapted for steam trap use and which has many points of advantage over the valves now ordinarily in use for this purpose.

A further object of the invention is to provide a valve for controlling the flow of water from a steam trap in which the interior parts may be easily removed for repairs or replacement without disconnecting the valve from its pipe connections.

A further object of the invention is to provide a valve having a removable valve seat which may be easily removed without disconnecting the valve from its pipe connections.

A further object of the invention is to provide a valve which is of simple construction, is strong and durable and is well adapted for the purpose described.

With the above and other objects in view the invention consists of the improved valve and its parts and combinations as set forth in the claims, and all equivalents thereof.

In the accompanying drawing in which the same reference characters indicate the same parts in all of the views:

Figure 1 is a top view of the improved valve, parts broken away and other parts being shown in section to illustrate interior construction;

Fig. 2 is a vertical sectional view taken on line 2—2 of Fig. 1;

Fig. 3 is a vertical sectional view taken on line 3—3 of Fig. 1 and at right angles to Fig. 2; and Fig. 4 is a side view in outline showing the valve mounted on a steam trap.

Referring to the drawing the numeral 8 indicates a steam trap, 9 the water inlet pipe leading thereto and 10 the outlet pipe to which the improved valve 11 is connected. The outlet pipe 10 projects into the casing of the trap and into an open top float 12 to a point adjacent the bottom portion of said float. The float is carried by an arm which is mounted on a rock shaft 13, and the rock shaft extends through the casing of the trap and is provided with a weighted lever arm 14 for connection with the valve in a manner to be described later.

The valve casing 15 is divided by a partition 16 into an upper inlet chamber 17 and a lower discharge chamber 18. The upper chamber is provided with a threaded inlet opening 19 into which the discharge pipe 10 extends and is connected, and the lower chamber 18 is provided with a threaded outlet opening 20 to receive a discharge pipe 21 which carries the water away from the trap.

The partition 16 is provided with a threaded opening 22 to receive the removable shouldered and threaded valve seat member 23 mounted therein. This member forms a seat for a ball valve 24 and is provided with upstanding guard fingers 25 which permit vertical play of the ball valve and guide the valve to its seat. The upstanding guard fingers also serve as a means whereby the valve seat member may be engaged to remove or replace the said member in the partition. Directly above the valve seat member the valve casing is provided with a threaded opening 26 which is of larger diameter than the valve seat member so that said member may be easily unscrewed and removed through said opening. The said opening is covered by a threaded cap 27 screwed therein and having a depending stop projection 27' for limiting the movement of the ball valve.

A rock shaft 28 extending horizontally through the wall of the valve casing and into the discharge chamber to one side of the valve seat has a cranked arm 29 formed on its inner end which extends to a position immediately beneath the conical opening 23' of the valve seat and is provided with an upstanding pin 30 which is positioned to extend through the conical opening and engage and lift the ball valve when the cranked arm is swung upwardly by the rock shaft.

The rock shaft is journaled in a removable extension bearing 31 which is threaded into the valve casing and at its outer end is provided with a stuffing nut 32 to form a water and steam tight packing around the rock shaft which projects therethrough.

The inner end of the rock shaft is also journaled on a bearing pin 33 which projects inwardly from a plug 34 threaded into the valve casing and enters an opening 35 formed in the inner end of the rock shaft.

As the threaded portion of the removable extension bearing 31 is of larger diameter than the rock shaft the rock shaft may be easily removed through the threaded opening when the extension bearing and the plug are unscrewed from the casing.

The outer end portion of the rock shaft has a lever arm 36 mounted thereon and which at one end is provided with a weight 37 for normally holding the cranked portion of the rock shaft in its lowermost position and at its opposite end has a linked connection 38 with the weighted lever arm 14 and is moved thereby. The weighted end of the lever arm 36 is supported when in its lowermost position by a stop rod 39 projecting outwardly from the valve casing and upon which the lever arm rests.

In operation the trap casing is presumed to be partly filled with water and the float in its uppermost position and the ball valve in closed position. The water of condensation and under pressure will flow into the trap and gradually rise to a point where it will overflow the upper edge of the float and fill said float and when filled the float will lose its buoyancy and swing downwardly to the bottom of the casing with a quick positive movement. This movement will cause the connected levers to open the ball valve against the pressure of the steam and the said pressure will force the water in the float out through the discharge pipe. The water within the float will continue to flow through the discharge pipe until the said float is emptied to such an extent that its buoyancy will cause it to rise and in rising the levers actuate the rock shaft and the ball valve will be disengaged and drop to closed position. The parts will remain in this position until the water again rises and overflows the float, when the same operation will be repeated. In use if any of the interior parts of the valve indicate wear they may be easily removed without disconnecting the valve casing from the pipe connections.

From the foregoing description it will be seen that the valve is of very simple construction and is particularly adapted for use in connection with steam traps.

What I claim as my invention is:

1. A valve, comprising a casing divided by a partition to form an upper and a lower chamber, the upper chamber being provided with an inlet opening and the lower chamber with an outlet opening, said partition provided with a threaded opening and the casing having a threaded opening directly above the partition opening, a threaded cap for the threaded casing opening, a removable valve seat threaded in the partition opening and having upstanding valve guide means, a ball valve resting on the valve seat, and a rock-shaft extending through the casing and into the lower chamber and having a cranked arm on its inner end provided with an upward extension which engages the ball valve, and a weighted arm mounted on the outer end of the rock shaft which holds the cranked arm normally out of engagement with the ball valve.

2. A valve, comprising a casing having an upper inlet chamber and a lower outlet chamber, a removable valve and valve seat mounted between the two chambers, said valve seat being within the inlet chamber and threaded to the casing, a capped opening in the casing above the valve seat and through which the valve and valve seat may be removed, an extension bearing threaded into the casing of the lower chamber, a plug threaded into the casing of the lower chamber and having an inwardly extending bearing pin, a rock shaft extending through and journaled in the extension bearing and engaging the bearing pin and having a cranked arm on its inner end provided with a upstanding pin which may be swung through the valve seat opening and into engagement with the valve to move said valve from its seat, the rock shaft and its cranked arm being removable from the lower chamber through the casing opening which receives the extension bearing when said bearing is removed from the casing, and means for turning the rock shaft.

In testimony whereof, I affix my signature.

JOHN H. HIMES.

Copies of this patent may be obtained for five cents each, by addressing the "Commissioner of Patents, Washington, D. C."